United States Patent [19]

Chambers

[11] Patent Number: 4,915,400
[45] Date of Patent: Apr. 10, 1990

[54] SNOWBOARD TOY

[75] Inventor: David W. Chambers, 4 Almond Lane, Ottawa, Ontario, Canada, K2L 3T2

[73] Assignee: David W. Chambers, Ottawa, Canada

[21] Appl. No.: 340,353

[22] Filed: Apr. 19, 1989

[51] Int. Cl.[4] .............................................. B62B 15/00
[52] U.S. Cl. .................................................... 280/14.2
[58] Field of Search ............... 280/616, 617, 619, 621, 280/611, 14.2, 14.3, 12.1, 11.3; 114/39.2; 441/70, 75

[56] References Cited

U.S. PATENT DOCUMENTS 4,221,394  9/1980  Campbell ........................... 280/14.2
4,241,929 12/1980  Carry ................................. 280/14.2
4,305,603 12/1981  Müller et al. ...................... 280/14.2

Primary Examiner—Charles A. Marmor
Assistant Examiner—Richard Camby

[57] ABSTRACT

A snowboard toy is disclosed having an improved safety release foot harness. The toy has a semi-rigid ski platform having an upturned front end and a main body portion extending rearwardly from the front end. A number of strap retainers are located on the main body portion with one strap retainer located towards the rear of the main body portion and one located towards the front. The strap is secured at one end and has a free end passing through the strap retainers. The strap forms foot retaining loops and when the snowboard toy is in use the strap is pulled on the free end to create tension to secure a person's feet to the snowboard toy beneath the strap. Upon release of the tension in the strap the feet are also released.

10 Claims, 2 Drawing Sheets

SNOWBOARD TOY

BACKGROUND OF THE INVENTION

Invention relates to an outdoor winter toy for use in particular relates to a snowboard toy.

Snowboards have been known and are used in outdoor winter recreation. During the winter, in colder climates, snow is a common occurrence. Snow facilitates many forms of outdoor winter recreation including skiing. In downhill skiing individual skis are rigidly attached to boots worn on each foot. A lifting device commonly referred to as a ski tow, is provided to mechanically raise a skier from the bottom of a hill to the top of a hill. The skier then slides down the hill, covered in snow, to the bottom where he again can be lifted up to the top by the ski tow.

While it is most common to have a pair of skis, another form of ski equipment is also becoming popular. This form of ski equipment is commonly called a snowboard and essentially consists of one short and broad ski upon which both feet of the skier are placed. Such snowboards typically have rigid pivoting harnesses which may be secured around each boot of the person using the snowboard. The action of the snowboard, in use, is somewhat similar to surfing.

However, there is a problem with this type of snowboard toy. Typically the foot harnesses are designed to accommodate a range of sizes of boot and a range in the type of boot that can be accommodated. Typically such boot harnesses involve straps with buckles which while providing a secure attachment for the foot, can be dangerous. In the event of a person using the toy falling the foot is not released from the snowboard toy which can lead to twisted or sprained ankles and knees.

What is desired is a safety harness which will at once accommodate a wide variety in boot types and sizes as well as provide a quick release in the event that the person using the snowboard toy falls to avoid damaging such a person's legs.

SUMMARY OF THE INVENTION

According to the present invention there is provided a snowboard toy comprising:

a semi-rigid ski platform having an upturned front end, a main body portion extending rearwardly from the front end and a plurality of strap retainers, with at least one strap retainer located generally towards the rear of said main body portion, and at least one strap retainer located generally towards the front of said main body portion, and a strap, secured at one end and having a free end, said free end passing through said strap retainers, said strap, having means for pulling on said free end to create tension to secure a person's feet to said snowboard toy beneath said strap, said feet being released from said toy upon the release of tension from said strap.

BRIEF DESCRIPTION OF THE DRAWINGS

To show more clearly how the present invention may be put into effect, reference will now be made by way of example only to the following drawings which describe a preferred embodiment of the present invention and in which.

DETAILED DESCRIPTION OF THE PREFERRED EMBODIMENT

Figure 1:
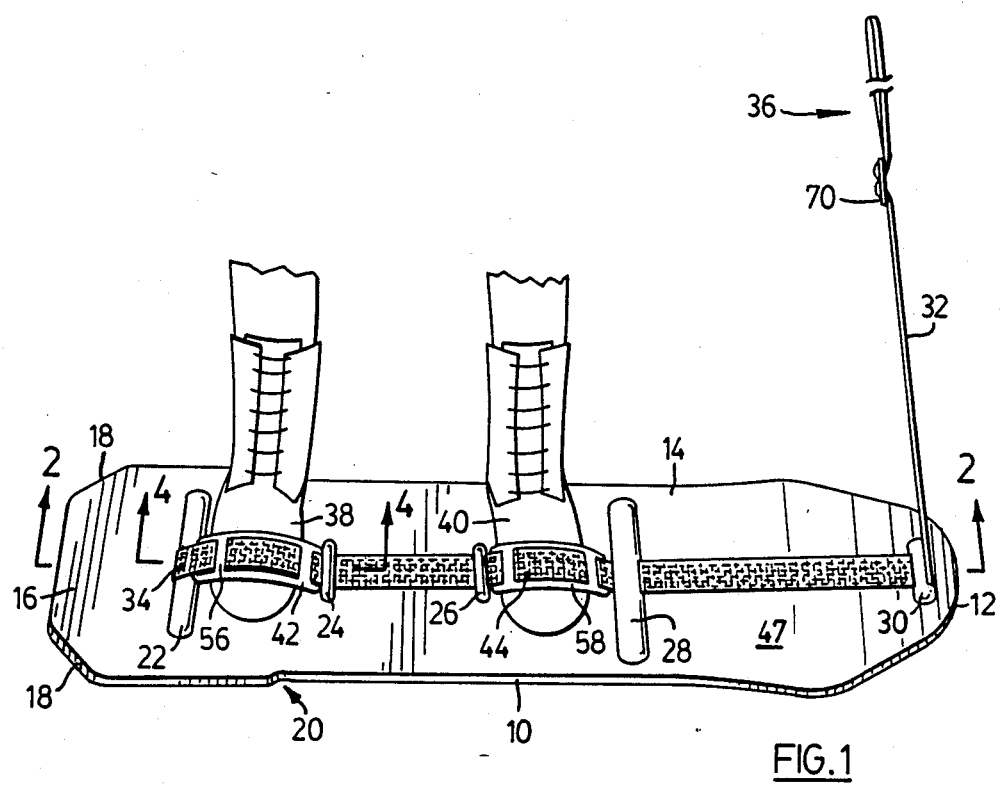
FIG. 1 is a perspective view of a snowboard toy according to the present invention.

FIG. 1 shows a snowboard toy 10 according to the present invention. The toy 10 has an upturned rounded front end 12 and a generally rectangular body portion 14 extending rearwardly therefrom to a rear end 16. The rear end 16 may include flared corners 18 as shown and may also be somewhat wider than the main body portion as shown at 20.

Also shown in FIG. 1 are strap retainers 22, 24, 26, 28 and 30. A strap 32 is shown having a fixed end 34 and a free end 36 which has been passed through the strap retainers 24, 26, 28 and 30.

Also shown in FIG. 1 is a right foot 38 and a left foot 40. The right foot 38 is shown located beneath a foot retainer loop 42 formed in the strap 32 between strap retainer 22 and strap retainer 24. The left foot 40 is shown beneath a foot retaining loop 44 formed in strap 32 between strap retainer 26 and strap retainer 28.

Figure 2:
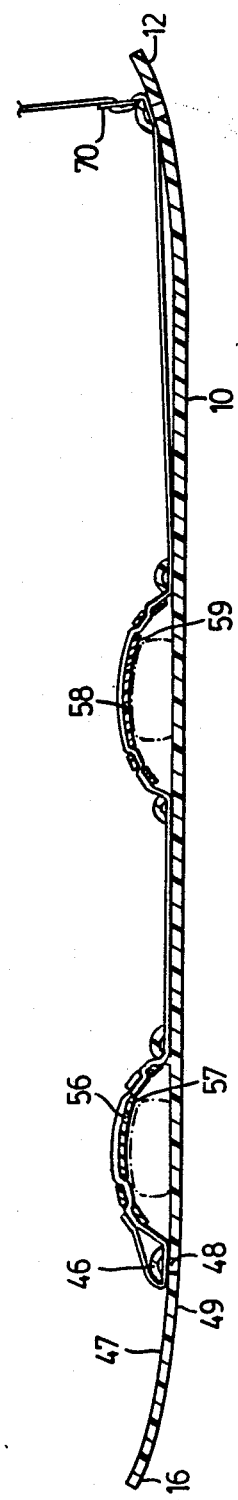
FIG. 2 is a sectional view along the lines 2—2 of FIG. 1.

FIG. 2 shows a sectional view of the toy 10 along the lines 22 in FIG. 1. The front end 12 is shown upturned slightly, and the rear end 16 is also shown upturned slightly. It can now be appreciated how the strap retainers are formed. Essentially, the strap retainers comprise a raised ridge 46 formed in the upper surface 47 formed above a groove 48 in the lower surface 49 of the toy 10. Opposed slots 50, 52 are then formed along the centre line of the toy 10.

The strap 32 is then threaded through the slots 50, 52 in the following manner. In respect of the strap retainer 22 the strap is threaded through and then doubled over and attached to itself as shown at 54. This attachment can be made by any conventional means such as grommets stitching or the like. Once attached at 54 this becomes the fixed end 34 of the strap 32. Then, the free end 36 is threaded through the opposed slots 50, 52 of each of these strap retainers 24, 26, 28 and 30.

Also shown in FIG. 2 are resilient gripping pads 56 and 58. The gripping pads 56, 58 are threaded onto the strap 32 in such a manner that they lie between the feet 38, 40 and the strap 32. The gripping pads 56, 58 are preferably made from soft flexible rubber having a high degree of frictional resistance. To increase the friction, between the feet 38, 40 and the strap 32 a gripping tread may be provided on surfaces 57, 59 of pads 56, 58 respectively.

Figure 3:
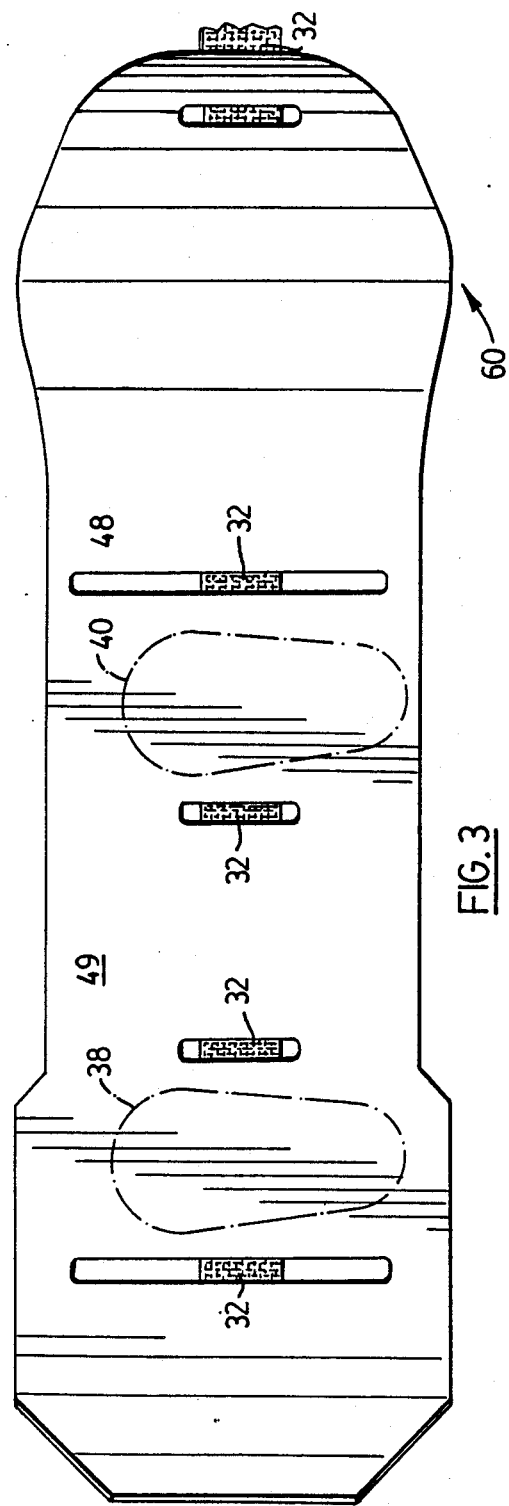
FIG. 3 is a top view of the snowboard toy of FIG. 1.

In FIGS. 1 and 3 it can be see that the strap retainers 22 and 28 substantially span the width of the snowboard toy 10. Because the strap retainers 22 and 28 are raised, they have a double function. In addition to housing the strap 32, the raised ridge of the retainer 22 acts as a brace against which the right foot 38 may be pushed. Similarly, the raised ridge of strap retainer 28 acts as a brace against which the left foot 40 may be pushed. This provides additional traction to a person using the toy 10. Of course, it will be appreciated that the reference to left foot and right foot in the foregoing could be reversed, in the event that the person was facing the opposite side of the board than as shown. The strap retainers 24 and 26 are much shorter, and are only marginally wider than the strap 32. The only limitation on the width of the strap retainers 24 and 26 is that a secure joint needs to be made between the strap retainer 24, 26 and the snowboard toy 10. The strap retainers 22, 24, 26 and 28 as shown have the advantage of ensuring that the width of the strap overlies the boot thus providing the maximum support.

In FIG. 3, the underside of the toy 10 is shown. The grooves 48 are visible, and shown in dotted outline are the right foot 38 and the left foot 40. FIG. 3 also shows the generally spoon shaped front end of the toy 10 indicated at 60.

Figure 4:
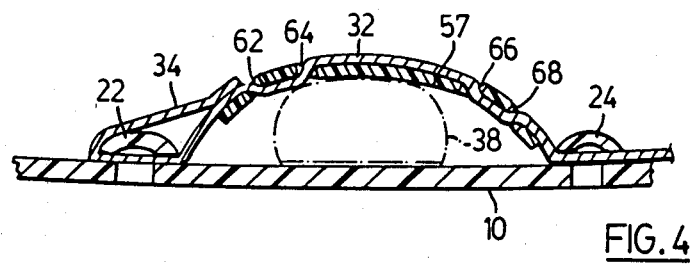
FIG. 4 is a sectional view along the lines 4—4 of FIG. 1.

FIG. 4 shows a detailed view of the gripping pad 56. The gripping pad 56 would have slots 62, 64, 66 and 68 formed therein. The free end 36 of the strap would be threaded through slot 62 from the outside to the inside, then back through slot 64 from the inside to the outside, then along the back of the gripping pad 56, then from the back to the front through slot 66, and then from the front to the back through slot 68. Then the free end would be threaded through the strap retainer 24. Ideally the gripping pads 56 and 58 will make it more difficult for right foot 38 and left foot 40 to move laterally with respect to the strap 32. However, it is desirable that the strap 32 not be constrained by the gripping pads 56 and 58 so that some freedom is present for the gripping pads 56 and 58 to move along the strap 32.

It can now be appreciated how the present invention may be put into effect. When the toy is to be used, a person will stand on the toy 10 as shown in FIG. 1 with their feet placed under the foot retaining loops 42 and 44. Then, a firm grip can be taken on the free end 36 of the strap 32 to provide tension. This forces the strap 32 against the gripping pads 56 and 58 and in turn forces the gripping pads 56 and 58 against the feet 38 and 40. Thus, as long as tension is maintained, the feet 38 and 40 are firmly held in place. Additionally, the strap 36 assists the person using the toy in balancing.

In the event that the person using the toy falls, for example after going over a bump, then they will tend to naturally and immediately release their hold on the free end 36 of the strap 32. Upon a release of the tension in strap 32 there is no longer any force keeping the gripping pads 56 and 58 secured against the feet 38 and 40. Consequently, the feet 38 and 40 may be freely withdrawn from the foot retaining loops 42 and 44. In the course of falling, it is quite likely that being so freed, the feet will easily come out of the toy 10. This will then prevent the feet or legs of the person using the toy from being forcibly bent in an injurious manner.

As shown in FIG. 1, the free end 36 of the strap 32 may be folded over and secured at a clip 70. The clip 70 forms a loop 72 which will make the free end 36 easier to grasp. However, the clip 70 may also serve another function. As shown in FIG. 2, the clip 70 may be worked down away from of the free end 36 of the strap 32 until it is adjacent the strap retainer 30. In this manner, the clip 70 can slow the rate of loosening of the tension in the strap 32 upon losing tension at the free end 36. This would be desirable in the event of a momentary loss of tension in the free end 36, which might occur for example while going over a bump. In such a case, the clip 70 cinched adjacent strap retainer 30 would ensure that all tension was not lost from foot retaining loops 42 and 44 in strap 32. Thus, if desired, the present toy 10 can be adapted to include a means for maintaining the tension in the strap 32 adjacent the right foot 38 and left foot 40 whether or not there is tension at the free end 36. Of, in such a case, it would be desirable that in the event of a fall, the clip 70 not be so secure as to not allow the feet 38, 40 to be released which would be dangerous. An additional advantage of the present invention is that boots of all sizes and types may be accommodated under the flexible strap 32 without the need for any alterations other than a loosening or tightening of the tension on the strap 32.

The snowboard toy 10 is preferably formed from high density polyethylene. The preferred method of forming is by molding. As can be seen, the method of forming the strap retainers 22, 24, 26, 28 and 30 involves molding a ridge 46 having a groove on the underside 48. This method of construction involves no further labour. However, if desired, u-shaped brackets could be glued, screwed or otherwise attached to the upper surface of the snowboard 10 in which case the grooves 48 need not be formed. In some cases, although such u-shaped brackets may constitute an increase in the cost of making the snowboard toy 10, they might be preferable since the grooves 48 increase the friction of the lower surface of the snowboard toy 10 running over the snow. The increased friction may in some cases undesirably affect the performance of the toy 10.

It will be appreciated by those skilled in the art that many variations are possible within the broad scope of the present invention. For example, while the invention has been described in association with five strap retainers, it would be possible to utilize only three and have the right foot 38 and the left foot 40 retained underneath the same foot retaining loop. These, and other modifications will be apparent to those skilled in the art and still fall within the broad scope of the invention.

I claim:

1. A snowboard toy comprising:
   a semi-rigid ski platform having an upturned front end, a main body portion extending rearwardly from the front end and a plurality of strap retainers, with at least one strap retainer located generally towards the rear of said main body portion, and at least one strap retainer located generally towards the front of said main body portion, and
   a strap, secured at one end to the board and having a free end, said free end passing through said strap retainers,
   said strap, having means for pulling on said free end to create tension to secure a person's feet to said snowboard toy beneath said strap, said feet being released from said toy upon the release of tension from said strap.

2. The snowboard toy as claimed in claim 1 having at least three strap retainers, forming, in combination with said strap, at least two foot retaining loops.

3. The snowboard toy as claimed in claims 1 or 2, further including at least one raised ridge which extends substantially side to side across said ski platform.

4. The snowboard toy as claimed in claim 1 having five strap retainers, with the most forwardly one located adjacent said rounded front end of said platform, said strap, forming two foot retaining loops between said other four strap retainers.

5. The snowboard toy as claimed in claim 4 wherein said strap includes resilient gripping means attached on said foot retaining loops, said gripping means having a high coefficient of friction.

6. The snowboard toy as claimed in claims 1, 2 or 4 wherein said strap is doubled over at said free end at a clip, said strap thereby forming a gripping loop at said free end.

7. The snowboard toy as claimed in claim 6 wherein said clip may be secured against said toy to retain a predetermined amount of tension in said strap.

8. The snowboard toy of claim 1 further including a strap retainer adjacent said upturned front end.

9. The snowboard toy of claim 1 wherein said front end is generally rounded, and said ski platform extending rearwardly from said front end is general rectangular and said strap retainers are integrally formed with said platform.

10. The snowboard toy of claim 9 wherein said ski platform and said strap retainers are molded from high density polyethylene.

* * * * *